United States Patent
Rigal

[11] Patent Number: 5,881,155
[45] Date of Patent: Mar. 9, 1999

[54] SECURITY DEVICE FOR A SEMICONDUCTOR CHIP

[75] Inventor: Vincent Rigal, Sceaux, France

[73] Assignee: Schlumberger Industries, Montrouge, France

[21] Appl. No.: 828,649

[22] Filed: Mar. 31, 1997

[30] Foreign Application Priority Data

Apr. 1, 1996 [FR] France .................................. 96 04151

[51] Int. Cl.$^6$ .............................. H04L 9/00; H04K 1/00
[52] U.S. Cl. .................................... 380/44; 380/4; 380/23
[58] Field of Search .................................... 380/4, 23, 44

[56] References Cited

U.S. PATENT DOCUMENTS

| | | | |
|---|---|---|---|
| 4,591,189 | 5/1986 | Holmen et al. | 283/23 |
| 4,989,154 | 1/1991 | Yamashita et al. | 364/482 |
| 5,245,293 | 9/1993 | Runner et al. | 324/663 |
| 5,384,847 | 1/1995 | Hendrickson et al. | 380/23 |
| 5,434,917 | 7/1995 | Naccache et al. | 380/23 |
| 5,469,557 | 11/1995 | Salt et al. | 395/425 |
| 5,680,055 | 10/1997 | Seitz et al. | 324/715 |
| 5,799,080 | 8/1998 | Padmanabhan et al. | 380/4 |

FOREIGN PATENT DOCUMENTS 510 433 A  10/1992  European Pat. Off. .
WO 96 16378 A  5/1996  WIPO .

OTHER PUBLICATIONS

"Partitioning Function and Packaging of Integrated Circuits for Physical Security of Data", Jun. 1989, IBM Technical Disclosure Bulletin, vol. 32, NR. 1, pp. 46–49 XP000033241 –entire document.

Primary Examiner—David Cain
Assistant Examiner—Hrayr A. Sayadian
Attorney, Agent, or Firm—Frishauf, Holtz, Goodman, Langer & Chick, P.C.

[57] ABSTRACT

Security device for preventing access to confidential information stored in a semiconductor chip, or protected chip. The security device comprises a second semiconductor chip, or protective chip, with the two chips facing each other and being coupled to each other by communication terminals. The protected chip is coupled to external circuits via the protective chip, and the two semiconductor chips are separated by a semiconductor resin having a non-homogeneous electrical resistivity. The protective chip is provided with means for measuring a plurality of resistances through the semiconductor resin and with means for determining, at least from the measured resistances, an encryption key intended to be communicated to the protect chip to protect the confidential information.

23 Claims, 3 Drawing Sheets

SECURITY DEVICE FOR A SEMICONDUCTOR CHIP

FIELD OF THE INVENTION

The present invention concerns a security device designed to prevent access to confidential information stored in a semiconductor chip. The invention is particularly advantageous in the field of secure electronic memory systems used in an encrypted television or to carry out financial transactions, such as portable payment terminals.

BACKGROUND OF THE INVENTION

Secure electronic memory systems include security devices generally implanted in electronic modules, known as security application modules (SAM). These modules are very important as they contain confidential information, such as bank keys, the discovery of which would enable access to all of the electronic transaction system.

The confidential information to be protected is usually written into an electronic layer of a semiconductor chip, or microchip, with a passivation layer generally covering the electronic layer.

The passivation layer may not be a sufficient obstacle to gaining access to the confidential information, especially if sophisticated means are used to read the information through the passivation layer. Such reading means may utilize scanning techniques of the particle beam type, for example.

Existing security devices for safeguarding the confidential information include devices employing conventional intrusion sensors adapted to protect an enclosure containing the semiconductor chip with the information.

Two other approaches are known which protect the semiconductor chip from exterior reading.

The first approach masks the pattern of the semiconductor chip to be protected, for example by means of metalization, a grid of dummy circuits or a diamond carbon layer.

The second approach stores the confidential information in a volatile RAM type memory and possibly combines it with random numbers that are changed continuously. The information is then accessible only by means of an operating system that controls access. The principles used are identical to those used for cards on which a microprocessor is mounted, also known as smartcards or chipcards. With the second approach, the information contained in the RAM is always lost if the power supply to the semiconductor chip is interrupted. In such case, access to the information is not impossible providing the following are known:

(a) how to remove the covering of the semiconductor chip package when it is active (i.e., ON rather than OFF), without causing short-circuits that would lead to the loss of information, (b) the exact schematic of the semiconductor chip circuitry, (c) the memory scrambling table, (d) the address of the confidential information in the memory, and (e) the correct manner of writing and reading the address bus and the data bus in real time.

However, the various techniques mentioned hereinabove have the disadvantage of being ineffective if highly sophisticated tampering means are employed or of being costly, particularly when using a diamond carbon layer mask.

SUMMARY OF THE INVENTION

An object of the present invention is to provide a security device designed to prevent access to confidential information contained in a semiconductor chip, referred to hereinafter as a "protected" chip, which security device offers more effective protection while remaining compatible with standardized fabrication processes.

In accordance with one aspect of the present invention, the security device comprises a second semiconductor chip, or "protective" chip, with both chips facing each other and being coupled to each other by communication terminals. The protected chip is connected to external circuits via the protective chip, and the two semiconductor chips are separated by a semiconductor resin having a non-homogeneous electrical resistivity. The protective chip is provided with means for measuring a plurality of resistances through the semiconductor resin and with means for determining, at least from the measured resistances, an encryption key intended to be communicated to the protected chip to protect the confidential information.

DETAILED DESCRIPTION OF THE INVENTION

Figure 1:
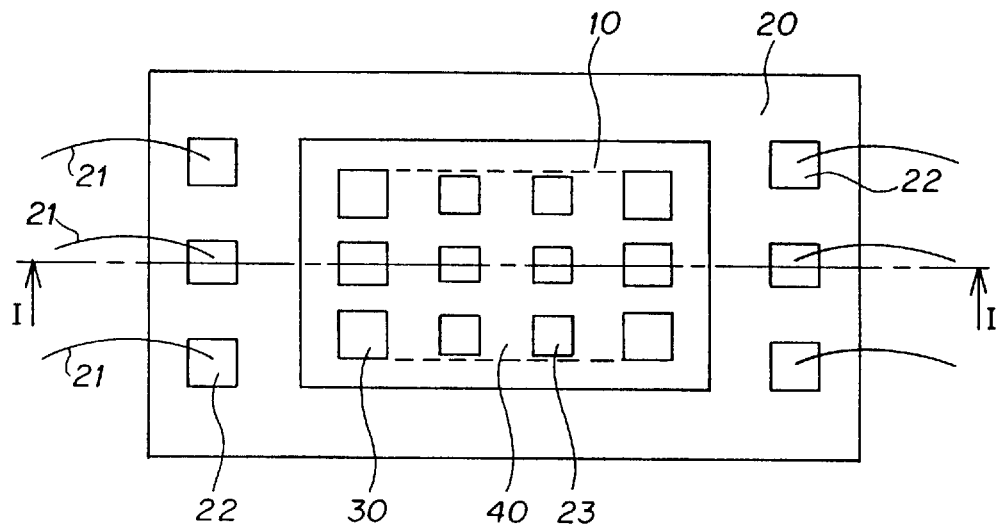
FIG. 1 is a top view of a security device in accordance with a first embodiment of the invention.

A general discussion of the invention will be presented first, and followed by a detailed description of the invention as shown in the drawings.

In a first embodiment of the invention, a semiconductor resin having a non-homogenous resistivity is sandwiched between the protected chip and the protective chip. The protective chip includes means for measuring a plurality of resistances through the resin. The protective chip also includes means for determining an encryption key. This determining means comprises means for processing the resistances measured on the semiconductor resin to establish an encryption key (or "resistive key" Kr). The processing means are comparison means, for example, for comparing the measured resistances.

Thus, when the security device of the invention is initialized, the measuring means of the protective chip measure a certain number of resistances through the semiconductor resin. The values of the resistances measured in this way are processed by the determining means in order to constitute the resistive key Kr, which is then communicated to the protected chip via the communication terminals. The key Kr is subsequently used by the protected chip to encrypt certain confidential information, before storing it in a non-volatile memory, and then to decrypt the information before using it.

In this configuration, physical attack on the protected chip would provide access only to non-sensitive information or to encrypted information. Decrypting presupposes a knowledge of the key Kr. Physical attack presupposes access to the active surface of the chip, and therefore destruction of the semiconductor layer, which permanently prevents reconstruction of the resistive key Kr.

Generally speaking, and independently of the other embodiments to be described, the security device of the invention will operate in such a way that the measuring means and the determining means are activated as soon as the device is initialized, and the encryption key determined in this way is immediately communicated to the protected chip.

In a second embodiment of the invention, the determining means further comprise a secondary key $K_E$, stored in a mon-volatile memory of the protective chip. The encryption key intended to be communicated to the protected chip is a combination of the resistive key Kr and of the secondary key $K_E$. This embodiment foils an attack on the device in which the protective chip would be removed, for example machined away, to leave only the semiconductor resin. The resistive key Kr could be determined by resistance measurement without it being possible to reconstitute the complete encryption key since by hypothesis the secondary key $K_E$ would not be known.

In another embodiment aiming at the same result, the measuring means carry out a number of resistance measurements and the protective chip holds information CI specific to it and defining a list of resistances to be used to determine the resistive key Kr. This also renders attack by machining ineffective since the perpetrator would not know how to deduce the resistive key Kr from the resistance map.

In a variant of this latter embodiment, the measuring means measure only wanted resistances, the list of which is dependent on the information $C_I$. It is even possible for the resistive key Kr to be combined with $C_I$ to constitute a second resistive key K'r. All these variants prevent fraud by machining.

A first improvement consists in providing the protected chip with an alarm mechanism. This detects attempted fraud and takes steps such as erasing sensitive information.

To this end, the measuring means and the determining means of the protective chip establish a second resistive key $K_A$ referred to hereinafter as the "alarm" key, when the device is initialized, and this key is written into the non-volatile memory of the protective chip, and the second resistive key $K_A$ is measured again each time the device is powered up and compared with the value $K_A$ in memory. The secondary key $K_E$ is erased in the event of a negative comparison result, the resistive key Kr otherwise being determined and communicated to the protected chip. The following improvements may be incorporated to make this embodiment reliable:

(a) The key $K_A$ is measured on the basis of the resistances without correlation with those used to determine the key Kr, to prevent Kr being deduced from $K_A$.

(b) The key $K_A$ is measured several times, up to a maximum number.

(c) Each time $K_A$ is measured, information is written into the non-volatile memory of the protective chip, for example updating the number of attempts still authorized, if any, or erasing the secondary key $K_E$.

(d) Rather than store the key $K_A$ in its entirety, it may be stored in a condensed form (CRC, hashing) and a conformance test carried out.

(e) The resistive key Kr is not measured if the measured value of $K_A$ does not conform.

In a third embodiment of the invention, the measuring means and the determination means establish a back-up second resistive key $K_S$, when the device is initialized, which key is written into said non-volatile memory of the protective chip, and calculation means are provided to calculate a third key $K_D$ from the resistive keys Kr and $K_S$ in such manner that the resistive key Kr can be calculated from the keys $K_S$ and $K_D$, the key $K_D$ being communicated to the protected chip and then stored in its memory.

Said calculation means may be an "exclusive OR" gate, for example, in which case:

$$K_D = Kr + K_S$$

and $$Kr = K_D + K_S$$

One of the chips may be provided with a mechanism for verifying the value Kr. A mechanism can be used that is based on a check-sum calculated by the protective chip and stored by the protected chip. It is essential that it is impossible to deduce the key Kr from this check-sum. It is therefore preferable for the length of the check-sum to be very short compared to that of the key Kr.

When the device is activated, the chip in question verifies the key Kr. If the result is not satisfactory, it requests the back-up key $K_S$ and is then in a position to reconstitute Kr knowing $K_D$. This constitutes a recovery mechanism in the event of measurement error or drift affecting Kr.

A second improvement includes having the protected chip advise the outside world as soon as it detects that Kr is erroneous. This can allow operation in a degraded mode, using $K_S$, while preparing to replace the device. It is also possible for the degraded mode to be time-limited, the protected chip disabling itself after a certain number of uses in degraded mode.

In another embodiment of the invention, the list of the resistances to be used is established by the protective chip when the device is initialized and in accordance with the measured resistances. This list is written in a non-volatile memory of the protective chip and complements or replaces the information $C_I$. Of course, after initialization of the device, all writing of lists into said non-volatile memory is prevented, for example by a physical or logical fuse.

In a first exemplary application, this list includes resistances with values that are sufficiently far apart. This prevents a minor change to the resistance values modifying the resistive key Kr.

In a second exemplary application, this list includes resistances with values in the same order of magnitude. This prevents a person deducing the resistive key Kr by separating the two semiconductor chips and using surface probes to measure the resistances of the resin.

Finally, provision may also be made for this list to include resistances with values contained within a given range, in a combination of the previous two examples.

Figure 2:
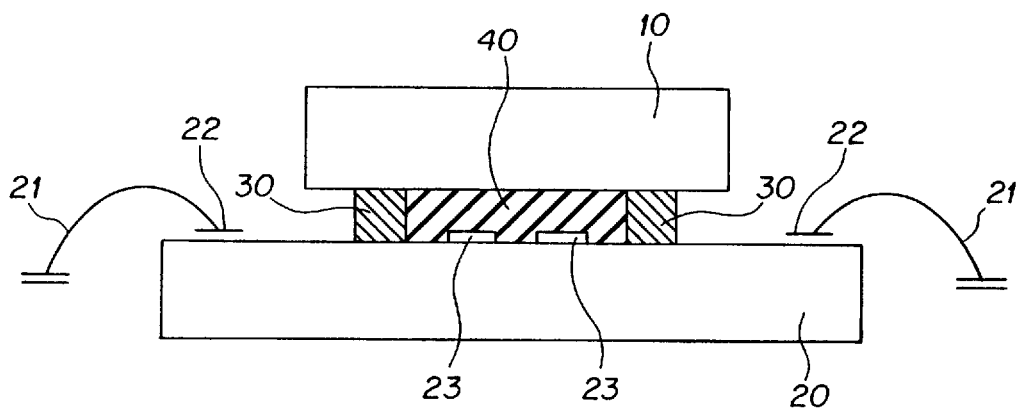
FIG. 2 is a cross-section taken along line I—I of FIG. 1.

Turning now to the drawings, the security device shown in FIGS. 1 and 2 is designed to prevent access to confidential information contained in a semiconductor chip 10, referred to hereinafter as the "protected" chip. The chip 10 may be a commonly available microcontroller (e.g., a microprocessor without internal memory, as made by Intel, Motorola, Texas Instruments, for example) provided with an electrically erasable memory (EEPROM or flash EPROM), a volatile memory (RAM) and encryption capabilities.

As can be seen in FIGS. 1 and 2, the security device also comprises a second semiconductor chip 20, referred to hereinafter as the "protective" chip, which may be larger than the protected chip 10.

The two semiconductor chips face each other and are electrically coupled to each other by communication terminals 30. The protective chip 20 is connected to external circuits, not shown, by connecting wires 21 bonded to connecting terminals 22 provided on the surface of the chip 20. In this way, the protected chip 10 can be coupled to the external circuits through the intermediary of the protective chip 20, via the communication terminals 30.

FIG. 2 also shows that the two semiconductor chips 10 and 20 are separated by semiconductor resin 40 having non-homogeneous electrical resistivity. The protective chip 20 is provided with means for measuring at least one set of a plurality of resistances through the. semiconductor resin.

This resin may comprise a polymer base filled with metal particles in a random distribution, for example. Elongate particles are advantageously chosen. The base resin may be an epoxy resin. In one embodiment, the resin layer receives non-homogeneous heat treatment, for example by random application of laser spots.

Determining means in chip 20 constitute an encryption key from the resistances measured in this way, and this key is intended to be communicated to the protected chip 10 to protect the confidential information.

In this first embodiment, the measuring means are formed by measuring terminals 23 in electrical contact with the semiconductor resin 40, the resistances being measured at pairs of measuring terminals in the way described in French Patent Application No. 95/11078, which is hereby incorporated by reference.

The encryption key determining means comprise means for processing the measured resistances adapted to establish a purely resistive encryption key Kr. Particular processing means are also described in the aforementioned French Patent Application. Suffice it to say that the processing may include comparing pairs of measured resistances and assigning a 1 bit or a 0 bit according to whether the comparison result is positive or negative. The list of the pairs of resistances to be measured and to be compared in order to determine the resistive key Kr is established by the protective chip 20 using information $C_I$ specific to it. In particular, two pairs of measuring terminals 23 whose resistances must be compared may be chosen to have a common measuring terminal.

The key for encrypting the confidential information of the protected chip 10 may simply be the resistive key Kr on its own. However, to make the device more secure, it is advantageous to combine the key Kr with other keys, such as a secondary key $K_E$ stored in memory of the protective chip or other resistive keys such as the keys $K_A$ and $K_S$ described above.

Figure 3:
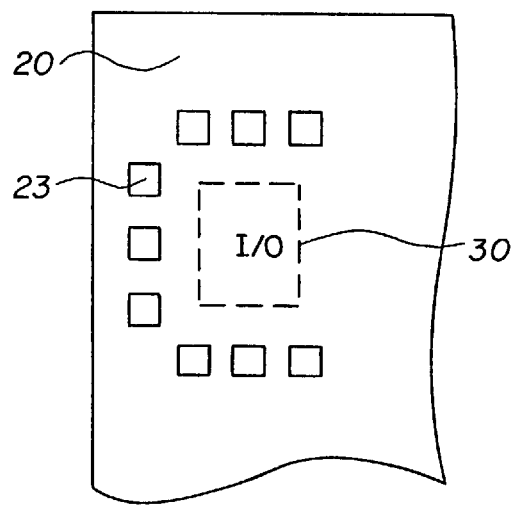
FIG. 3 is a top view of a first arrangement of the measuring terminals of the protective chip of the security device of FIG. 1.

In one variation of the security device of the invention, certain measuring terminals 23 are near terminals 30, and it is even possible for the measuring terminals 23 to surround the communication terminals 30, as shown in FIG. 3, in the case where the protected chip 10 is a conventional microcontroller using a serial input I/O which is surrounded in this manner. Of course, if the device includes a plurality of communication terminals 30, each of them is protected in a similar way.

FIG. 3 also shows that the measuring terminals 23 are preferably disposed between the communication terminal 30 to be protected and the edge of the protective chip 20. If a person inserts a probe between the two chips, as far as the terminal 30, which would enable that person to discover the resistive key Kr at the time of its transmission, the resistance measurements would be modified and Kr falsified. In the case where the key Kr is deduced from comparisons of resistances, the values measured around the terminal 30 are compared with values measured toward the center of the chip 20 in an area where access for a probe is difficult.

The dimensions of the measuring terminals 23 are advantageously smaller than the distance between two neighboring terminals 23. Likewise, it is preferable for the measuring terminals 23 to be small in size, in the same order of magnitude as the thickness of the semiconductor resin layer 40. Finally, the portions of resin 40, the resistances of which are to be measured, preferably have a length greater than the size of the measuring terminals 23, and this length ranges between the thickness of the semiconductor resin and 20 times the thickness of the semiconductor resin.

Figure 4:
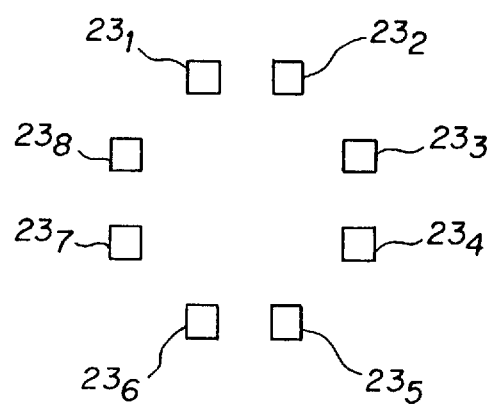
FIG. 4 is a top view of a second arrangement of the measuring terminals of FIG. 3.

The measuring terminals 23 are grouped into blocks of 6 to 10 terminals. As shown in FIG. 4, eight terminals $23_1$ through $23_8$ are used per block. The protective chip 20 compares two resistances measured respectively between two pairs of terminals of the same block. Comparison is generally preferable to measuring absolute values because it avoids the need to incorporate analog circuits (which measure the absolute value of resistivity, like an ohmmeter) into the protective chip 20 and because it is less sensitive to modification of the resistivity of the semiconductor resin layer 40.

In particular, a change of temperature does not modify the relative values of the resistances.

Generally speaking, the pairs of measuring terminals are chosen so that the lengths of the two resin portions to be compared are of the same order of magnitude. In FIG. 4, for example, the preferred choice will be to compare the pair $23_1$–$23_6$ with the pair $23_2$–$23_5$ or the pair $23_1$–$23_4$, but not with the pair $23_1$–$23_2$.

Figure 5:
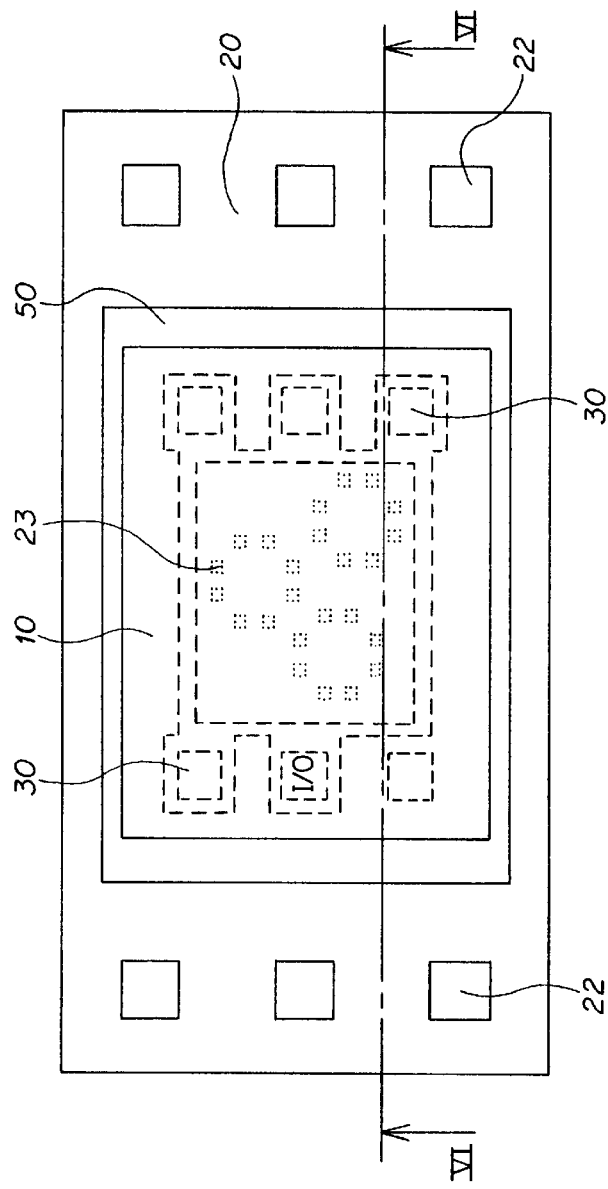
FIG. 5 is a top view of a second embodiment of the invention.
Figure 6:
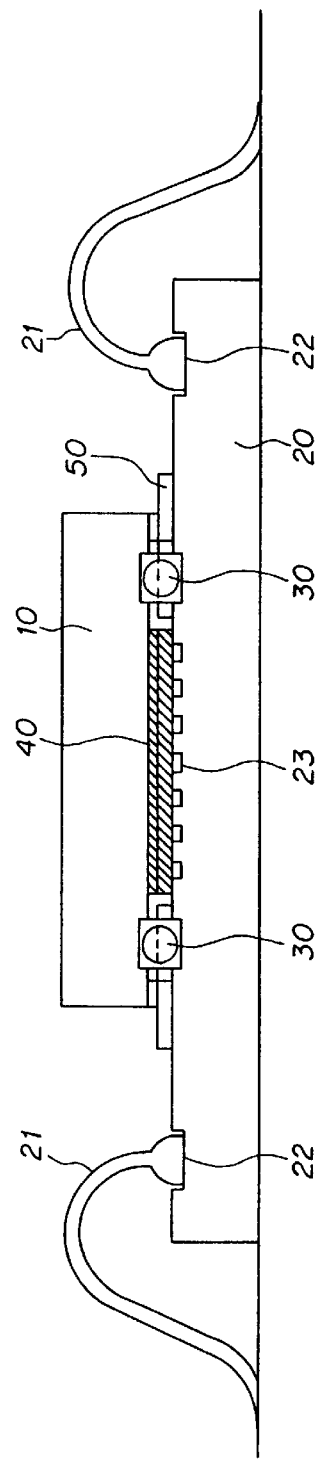
FIG. 6 is a cross-section taken along line VI—VI of FIG. 5.

In the second embodiment shown in FIGS. 5 and 6, a guard ring 50 is formed between chips 10 and 20 to surround and thereby protect the communication terminals 30. Guard ring 50 is a metallic layer used to electrically isolate the protected chip from external electrical influences. Its specific dimensions are not of particular importance. For example, guard ring 50 can be formed at the periphery of the protected chip 10 and on a surface of the protective chip 20.

The guard ring 50 is held at a given potential when the protected chip 10 is attached. Should a person insert a probe between the two chips as far as a communication terminal 30, the latter would be raised to the potential of the guard ring 50 and transmission therethrough would be prevented.

Although several embodiments of the present invention have been disclosed in detail above, various modifications thereto will be readily apparent to anyone with ordinary skill in the art. All such modifications are intended to fall within the scope of the present invention as defined by the following claims.

I claim:

1. Security device for preventing access to confidential information stored in a semiconductor chip ("protected chip"), comprising: a second semiconductor chip ("protective chip"), said protected and protective chips facing each other and being coupled to each other by communication terminals, the protected chip being coupled to external circuits via said protective chip, and wherein said chips have therebetween a semiconductor resin having a nonhomogeneous electrical resistivity, said protective chip including means for measuring a plurality of resistances through the semiconductor resin, and means for determining, at least from the measured resistances, an encryption key communicated to the protected chip, which key protect the confidential information.

2. Security device according to claim 1, wherein said determining means comprise means for processing the measured resistances to establish an encryption key Kr, or resistive key.

3. Security device according to claim 2, wherein said processing means are means for comparing the measured resistances.

4. Security device according to claim 3, wherein said measuring means comprise measuring terminals in electrical contact with the semiconductor resin, the resistances being measured at pairs of measuring terminals, and wherein two pairs of measuring terminals at which the resistances are compared have a common measuring terminal.

5. Security device according to claim 2, wherein the determining means further comprise a secondary key $K_E$ stored in a non-volatile memory of the protective chip, said encryption key being a combination of the resistive key Kr and the secondary key $K_E$.

6. Security device according to claim 2, wherein the measuring means and the determining means establish a back-up second resistive key $K_S$ when the device is initialized, which key is written into said non-volatile memory of the protective chip, and wherein calculation means are provided for calculating a third key Kd from the resistive keys Kr and $K_S$ in such manner that the key Kr can be calculated from the keys $K_S$ and $K_D$, the key $K_D$ being communicated to the protected chip and then stored in its memory.

7. Security device according to claim 1, wherein the protective chip holds information $C_I$ specific to it defining a list of resistances to be used to determine the resistive key Kr.

8. Security device according to claim 7, wherein the measuring means measure only the wanted resistances, the list of which depends on the information $C_I$.

9. Security device according to claim 8, wherein said determining means comprise means for processing the measured resistances adapted to establish an encryption key Kr, or resistive key, and wherein the resistive key Kr is combined with $C_I$ to constitute a second resistive encryption key K'r.

10. Security device according to claim 1, wherein the measuring means and the determining means establish a second resistive key $K_A$, or "alarm" key, when the device is initialized, which key is written into a non-volatile memory of the protective chip, and wherein said second resistive key is measured, each time the device is powered up, and compared with the memorized value $K_A$, the secondary key $K_E$ being erased in the event of a negative comparison result, the resistive key Kr being determined and communicated to the protected chip otherwise.

11. Security device according to claim 1, wherein the list of resistances to be used is established by the protective chip at the time of initialization of the device in accordance with the measured resistances.

12. Security device according to claim 11, wherein said list is written into a non-volatile memory of the protective chip.

13. Security device according to claim 12, wherein any writing of lists into said non-volatile memory is prohibited after initialization of the device.

14. Security device according to claim 11, wherein said list includes resistances having values that are sufficiently far apart.

15. Security device according to claim 11, wherein said list includes resistances having values of the same order of magnitude.

16. Security device according to claim 11, wherein said list includes resistances having values contained within a given range.

17. Security device according to claim 1, wherein the measuring means and the determining means are activated immediately as the device is initialized and the encryption key determined in this way is communicated immediately to the protected chip.

18. Security device according to claim 1, wherein said measuring means comprise measuring terminals in electrical contact with the semiconductor resin, the resistances being measured at pairs of measuring terminals.

19. Security device according to claim 18, wherein said measuring terminals are grouped into blocks of 6 to 10.

20. Security device according to claim 18, wherein the measuring terminals are near the communication terminals.

21. Security device according to claim 18, wherein the measuring terminals have a size of the same order of magnitude as the thickness of the semiconductor resin.

22. Security device according to claim 18, wherein the resistances to be measured have a length greater than the size of the measuring terminals and between the thickness of the semiconductor resin and 20 times the thickness of the semiconductor resin.

23. Security device according to claim 1, wherein a guard ring is formed between the communication terminals and at least the projection of the surface of the protected chip onto the protective chip.

* * * * *